(12) United States Patent  
Smets

(10) Patent No.: US 9,958,014 B2  
(45) Date of Patent: May 1, 2018

(54) COUPLING SYSTEM

(71) Applicant: Theodorus Cornelius Antonius Smets, Tilburg (NL)

(72) Inventor: Theodorus Cornelius Antonius Smets, Tilburg (NL)

(73) Assignee: Theodorus Cornelius Antonius Smets, Tilburg (NL)

(*) Notice: Subject to any disclaimer, the term of this patent is extended or adjusted under 35 U.S.C. 154(b) by 242 days.

(21) Appl. No.: 14/649,996

(22) PCT Filed: Dec. 2, 2013

(86) PCT No.: PCT/NL2013/000059  
§ 371 (c)(1),  
(2) Date: Jun. 5, 2015

(87) PCT Pub. No.: WO2014/088412  
PCT Pub. Date: Jun. 12, 2014

(65) Prior Publication Data  
US 2015/0316107 A1    Nov. 5, 2015

(30) Foreign Application Priority Data  
Dec. 6, 2012    (NL) ..................................... 1039933

(51) Int. Cl.  
*F16D 1/116* (2006.01)  
*G05G 1/12* (2006.01)  
(Continued)

(52) U.S. Cl.  
CPC .............. *F16D 1/116* (2013.01); *G05G 1/12* (2013.01); *A63B 22/0046* (2013.01);  
(Continued)

(58) Field of Classification Search  
CPC ... F16D 1/10; F16D 1/16; F16D 1/108; F16D 1/116; Y10T 403/591; Y10T 403/581;  
(Continued)

(56) References Cited

U.S. PATENT DOCUMENTS 3,240,519 A    3/1966   Weasler  
3,625,554 A *  12/1971  Mottais ................. B23B 31/113  
                                                    403/14  
(Continued)

FOREIGN PATENT DOCUMENTS

DE           929998       7/1955  
DE       202006007219    8/2006  
(Continued)

*Primary Examiner* — Michael P Ferguson  
(74) *Attorney, Agent, or Firm* — Gable Gotwals

(57) ABSTRACT

A coupling (1) for a shaft-end (2) having a square cross-section includes a front plate (6), a locking plate (7) and a rear plate (8) provided with square openings (9, 10, 11), in which the square shaft-end can be inserted. The locking plate can be rotated back and forth between an unlocked position (I), in which the square openings in the front plate, the rear plate and the locking plate coincide, and a locked position (II), in which the openings do not coincide. In the unlocked position the square shaft-end can be inserted through the coinciding square openings. Subsequently, the locking plate is rotated so that the shaft-end cannot be pulled out until the locking plate is returned into the unlocked position. The coupling can be used for easily interconnecting different types of parts, for example, applicable with exercise bicycles, bicycles, etc.

10 Claims, 5 Drawing Sheets

(51) Int. Cl.
*A63B 22/00* (2006.01)
*A63B 22/06* (2006.01)

(52) U.S. Cl.
CPC ... *A63B 22/0605* (2013.01); *A63B 2022/0611* (2013.01); *Y10T 403/32983* (2015.01)

(58) Field of Classification Search
CPC .... Y10T 403/58; Y10T 403/587; B62M 1/36; B62M 3/00
See application file for complete search history.

(56) References Cited

U.S. PATENT DOCUMENTS

| | | | | |
|---|---|---|---|---|
| 3,734,548 A | * | 5/1973 | Kieves | B26D 7/00 403/353 |
| 4,171,822 A | * | 10/1979 | Thun | B62M 1/36 280/259 |
| 4,337,614 A | * | 7/1982 | Briscoe | F16G 15/06 411/518 |
| 5,018,901 A | * | 5/1991 | Ferree | B23Q 1/0063 403/316 |
| 5,597,260 A | * | 1/1997 | Peterson | F16B 21/04 403/316 |
| 7,240,907 B2 | * | 7/2007 | Chen | B62M 3/00 280/259 |
| 7,798,513 B1 | * | 9/2010 | Salvant | B62H 7/00 280/259 |
| 8,104,988 B2 | * | 1/2012 | Lunn | F16G 15/06 403/154 |
| 2010/0120545 A1 | | 5/2010 | Huis | |

FOREIGN PATENT DOCUMENTS

| | | | | |
|---|---|---|---|---|
| EP | 0712667 | | 5/1996 | |
| EP | 0 779 130 | * | 6/1997 | ............ B25B 23/00 |
| WO | 2011160447 | | 12/2011 | |

\* cited by examiner

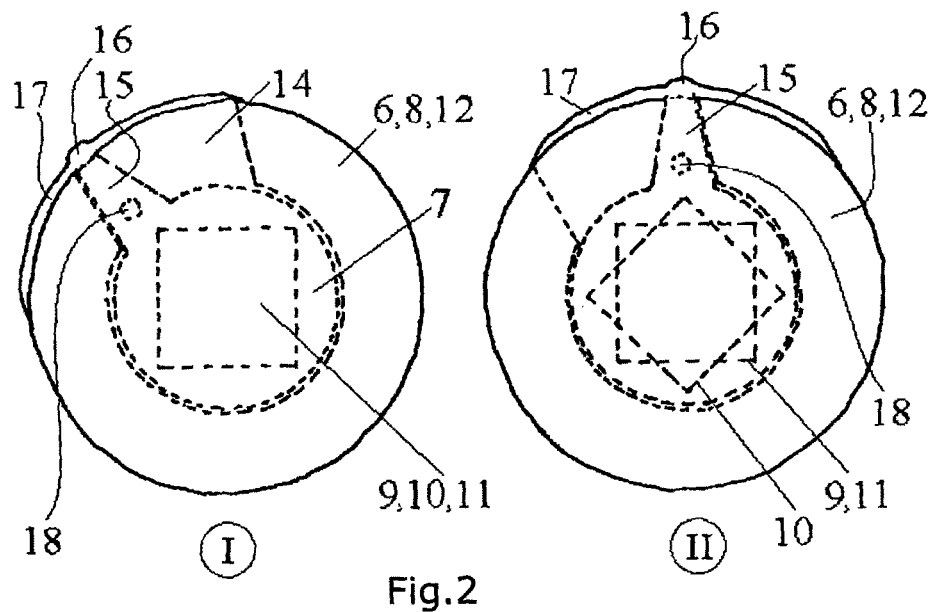
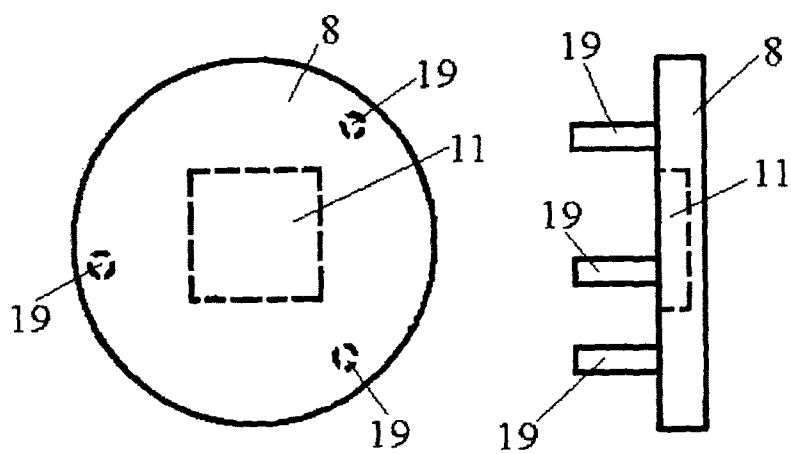
Fig. 2
Fig. 3

COUPLING SYSTEM

CROSS-REFERENCE TO RELATED APPLICATIONS

This application is the United States National Phase of Patent Application No. PCT/NL2013/000059 filed 2 Dec. 2013, which claims priority to Netherland Patent Application No. 1039933 filed 6 Dec. 2012, each of which are incorporated herein by reference.

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

STATEMENT REGARDING PRIOR DISCLOSURES BY THE INVENTOR

Not Applicable

BACKGROUND OF THE INVENTION

The invention relates to a coupling for a shaft-end, substantially having a square cross-section. Such a shaft-end is, for example, fixedly connected to or detachably coupled to a shaft (having a circular or square cross-section) or to another machine element or construction element.

BRIEF SUMMARY OF THE INVENTION

Object of the present invention is to provide for a coupling for a shaft-end having a square cross-section, by means of which another shaft, or any other machine element or construction element, is coupled to another shaft or another machine element or construction element, and this in principle without requiring any tools. In particular the invention is for use as a coupling element for an exercise bicycle, for example, by which cranks and pedals are quickly and easily coupled and decoupled. Alternatively the coupling according to the invention is used as a coupling element for a bicycle or other vehicle, with which cranks and/or wheels are coupled and decoupled. Furthermore, two or more shafts can be coupled to each other by using a dual or multiple configured coupling. However, the proposed coupling according to the invention is more broadly applicable than the examples of application suggested above, and is not restricted thereto.

According to the invention a coupling is provided for a shaft-end having a square cross-section, which at a distance (a) from its outer end is provided with a region, hereinafter indicated as transverse groove, having a (circular or non-circular) cross-section which is not greater—over any angle—than the smallest cross-section of the square shaft-end having a groove width (b), the coupling comprising, as seen from the shaft-end, a front plate, a locking plate and a rear plate, wherein the front plate and the locking plate both are provided with a continuous square opening, through which the square shaft-end is inserted and wherein the locking plate has a thickness which is not greater than the groove width (b), and wherein the rear plate is provided with a non-continuous square opening, in which the square shaft-end can be inserted (put in), wherein the front plate and the rear plate are fixedly interconnected in a position, in which the orientation of the square openings correspond to each other, wherein the locking plate is bearing-mounted rotatably between the front plate and the rear plate in such a way that it can be rotated back and forth between an unlocked position, in which the orientations of the square openings in the front plate and in the rear plate and the orientation of the square opening in the locking plate coincide with one another, and a locked position, in which the openings do not coincide, the coupling being arranged and sized such that in the unlocked position the square shaft-end can be inserted through the continuous square openings in the front plate and locking plate into the non-continuous square opening in the rear plate, after which the locking plate is rotated relative to the front plate and rear plate over a certain interlocking angle, by which the shaft-end is coupled with the assembly, which comprises the mutually interconnected front plate and rear plate and the interposed locking plate, so that the shaft-end can not be removed (pulled out) without reversely rotating the locking plate into its unlocked position.

In a preferred embodiment of the invention a bearing plate is provided, arranged between the front plate and rear plate, the bearing plate being arranged for bearing-mounting the rotatable locking plate in such a way that the centre line of the square opening in the locking plate, both in the unlocked position and in the locked position, substantially corresponds to the centre line of the square openings in the front plate and the rear plate. Preferably the bearing plate is provided with a recess and the locking plate is provided with (or connected to) an actuating element extending through the recess to the outside, the actuating element being dimensioned and configured such, that the actuating element can be used for rotating the locking plate back and forth between the unlocked position and the locked position. Preferably the actuating element is provided with (or connected to) a guard member, which is being arranged for protecting the space between the actuating element of the locking plate and the recess in the bearing plate. Furthermore preferably securing means are provided, which are being arranged for securing the locking plate or the actuating element relative to the front plate and/or the rear plate in the unlocked position and in the locked position.

BRIEF DESCRIPTION OF SEVERAL VIEWS OF THE DRAWINGS

Hereinafter, the invention will now be further discussed by means of a description of the drawings.

FIG. 2 shows a view of the coupling shown in FIG. 1;

FIGS. 3-5 show the essential elements of the coupling shown in FIG. 1;

DETAILED DESCRIPTION OF THE INVENTION

Figure 1:
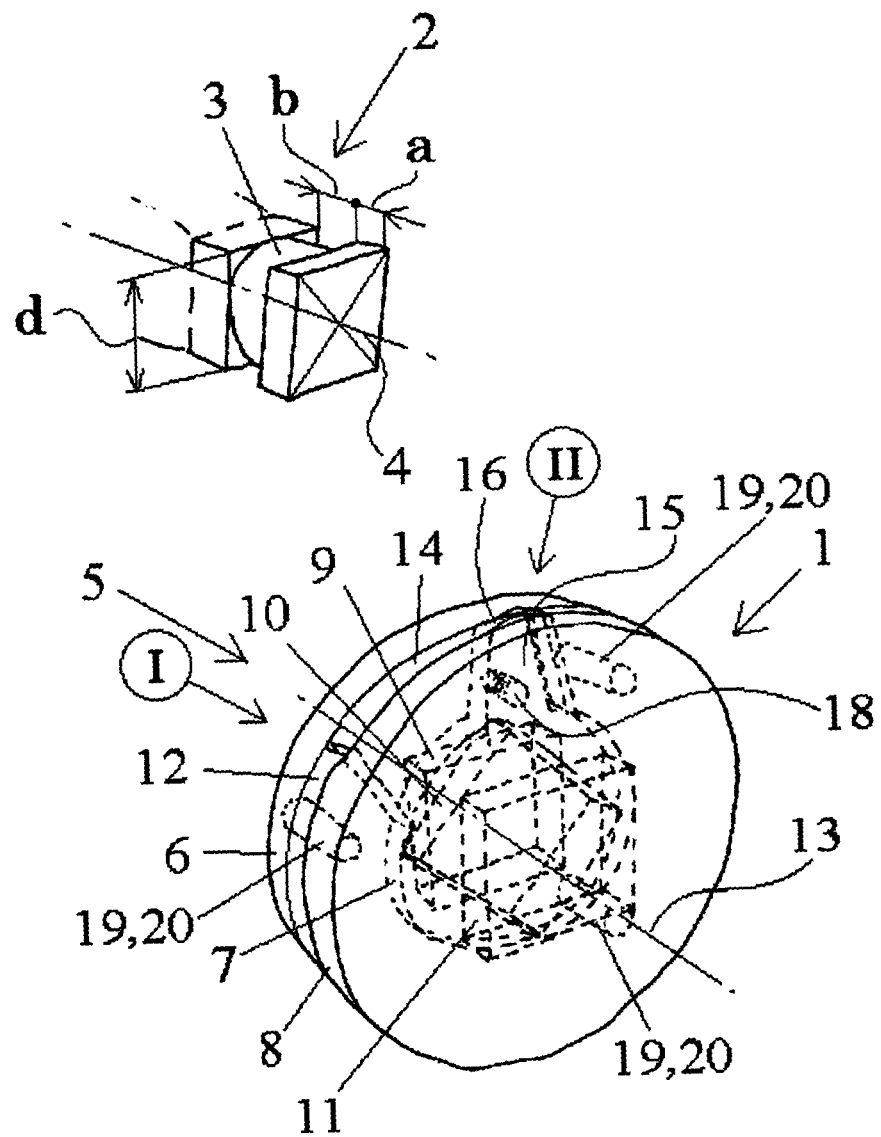
FIG. 1 shows in perspective an embodiment of a coupling according to the invention including a shaft-end.
Figure 4:
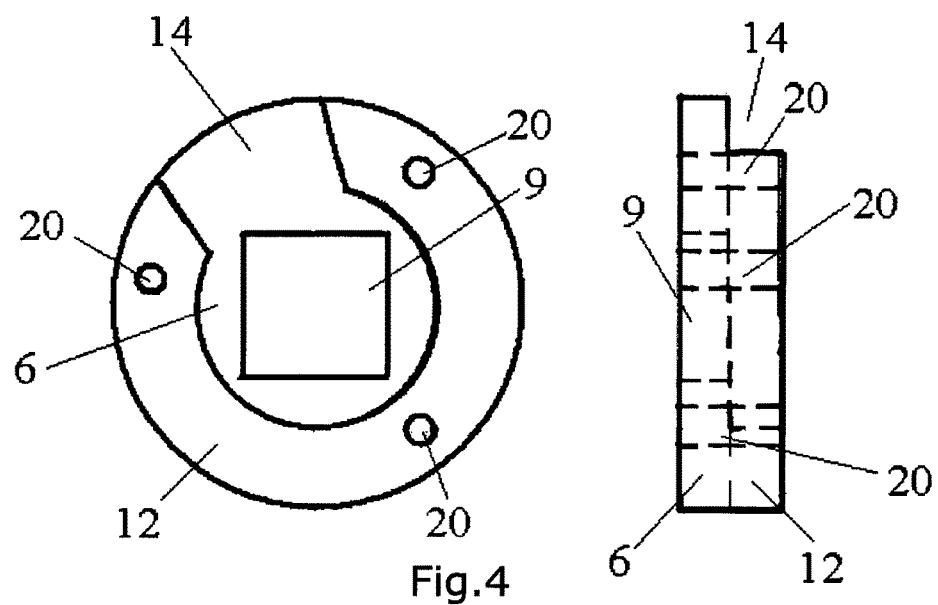
Figure 5:
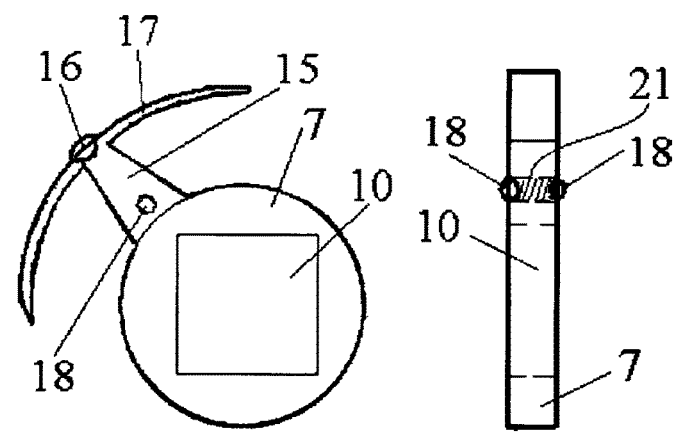

In all the FIGS. 1-7, a coupling 1 is shown for a shaft-end 2 having a square cross-section, the shaft-end at a distance (a) from its outer end is provided with a region, hereinafter indicated as transverse groove (3), having a circular—such as in the figures—or (optionally) non-circular cross-section which is not greater—over any angle—(ie, not over any angle of rotation around the centre line 4 of the shaft-end 2) than the smallest cross-section (d) of the square shaft-end 2, wherein the transverse groove is provided with a groove width (b).

The coupling 1 comprises, as seen from the shaft-end (arrow 5), a front plate 6, a locking plate 7 and a rear plate 8. The front plate 6 and the locking plate 7 both are provided with a continuous square opening 9 and 10 respectively (the last shown in FIG. 1 at an angle of about 45°) through which the square shaft-end is inserted, (when both are in the same angular position). The locking plate 7 has a thickness which is not greater than the groove width (b). The rear plate 8 is provided with a non-continuous square opening 11, in which the square shaft-end 2 (i.e. the front portion thereof with the length a) is inserted. The front plate 6 and the rear plate 8 are fixedly interconnected in a position, in which the orientation of the square openings 9, 11 correspond to each other. The locking plate 7 is bearing-mounted rotatably between the front plate 6 and the rear plate 8 in such a way that it can be rotated back and forth between an unlocked position I and a locked position II. In the unlocked position I the orientation of the square opening 9 in the front plate 6, the orientation of the square opening 11 in the rear plate 8 and the orientation of the square opening 10 in the locking plate 7 coincide with one another. In the locked position II the orientations of the openings do not coincide. (in FIG. 1, the opening 10 in the locking plate 7 is about 45° rotated relative to the openings 9 and 11 in the front plate 6 and the back plate 8 respectively). The coupling being arranged and sized such that in the unlocked position the square shaft-end 2 can be inserted through the continuous square openings 9 and 10 in the front plate 6 and locking plate 7, respectively, into the non-continuous square opening 11 in the rear plate 8, after which the locking plate 7 is rotated relative to the front plate 6 and the rear plate 8 over a certain interlocking angle (for example, approximately 45°), by which the shaft-end 2 is coupled with the assembly, which comprises the mutually interconnected front plate 6 and rear plate 8 and the interposed locking plate 7, so that the shaft-end can not be pulled out without reversely rotating the locking plate 7 into its unlocked position.

In addition to said plates, a bearing plate 12 is provided, arranged between the front plate 6 and rear plate 8, the bearing plate being arranged for bearing-mounting (within that bearing plate 12) the rotatable locking plate 7 in such a way that the centre line 13 of the square opening 10 in the locking plate 7, both in the unlocked position I and in the locked position II, substantially corresponds to the centre line 13 of the square openings in the front plate and the rear plate. The bearing plate 12 may form one piece with the front plate 6 or the rear plate 8, and, for example, be manufactured—as well as the other plates—by (injection) molding of metal or plastic. The plates 6, 7, 8 and 12 can also be manufactured by means of die cutting from plate-shaped starting material. The front plate 6, the bearing plate 12 and the rear plate 8 may be (fixedly) attached to each other, for example, by means of rivets 19 which pass through rivet holes 20. Bolted joints can also be used, and also glueing, fusing or pressing is possible.

The outer side of the locking plate 7 is substantially circular and is received within the (e.g.) circular internal shape of the bearing plate 12. The bearing plate 12 is provided with a recess 14 and the locking plate 7 is provided with (or connected to) an actuating element 15 extending through the recess 14 to the outside and having a portion 16 protruding outside (the outer periphery of) the front plate 6 and the back plate 8. The protruding portion 16 being dimensioned and configured such, that it can be used (by the user) for rotating the locking plate 7 back and forth between the unlocked position I and the locked position II.

The actuating element 15 can be provided with (or connected to) a guard member 17, which is being arranged for protecting the space between the actuating element 15 of the locking plate 7 and the recess 14 in the bearing plate 12. Furthermore securing means may be provided, for example in the form of one or two spring lock pins 18, which are being arranged for securing the locking plate 7 (or the actuating element 15) relative to the front plate 6 and/or the rear plate 8 in the unlocked position I and in the locked position II. For the spring element, a pressure spring 21 may be used.

Figure 6:
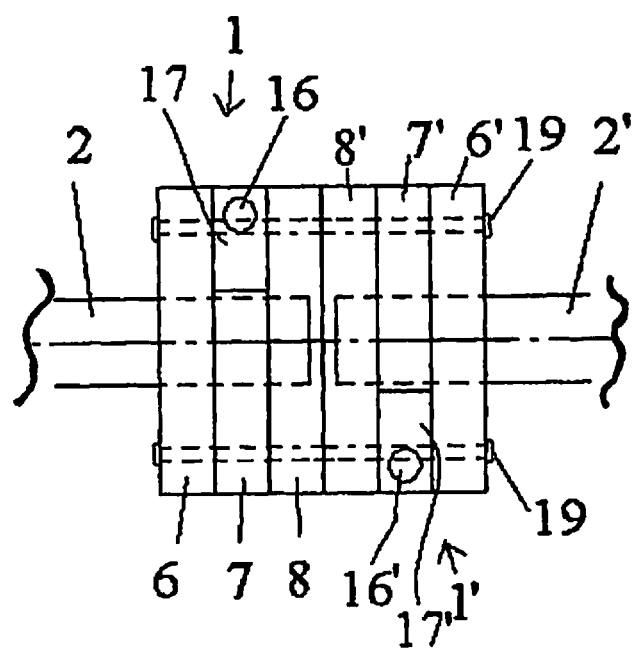
FIG. 6 shows a dual coupling, with which two shaft ends can be coupled.

FIG. 6 shows a coupling 1, as discussed above and shown in the FIGS. 1-5, being (directly) connected with at least one similar coupling 1', for interconnecting two or more shaft-ends 2, 2' having a square cross-section and each being provided with a transverse groove 3 as shown in FIG. 1b. The couplings 1 and 1' can be coupled easily to each other by means of long rivets 19 or draw bolts, extending through both couplings. Instead of two, more couplings 1, 1' etc. may optionally be connected (directly or indirectly) in order to mutually couple the same number of shaft-ends 2, 2' etc. (each being connected to a shaft, rod, or other machine or construction part).

Figure 7:
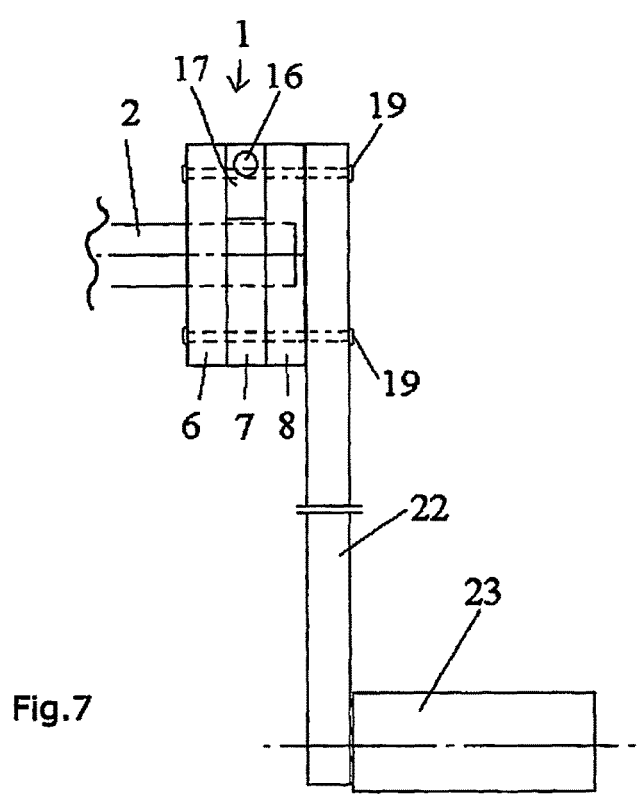
FIG. 7 shows a coupling, with which a crank, for example an exercise bike, is connected.

FIG. 7 shows a coupling 1 as discussed above and illustrated in the FIGS. 1-5, being connected to a substantially, with respect to the longitudinal direction of the shaft-end 2, transverse extending machine or construction part such as (in FIG. 7) a crank 22, which in the embodiment of FIG. 7 is connected to the rear plate 8 of the coupling 1. The crank 22—for example of a training device or a bicycle or other vehicle—can be directly connected with the coupling 1 by means of rivets 19 or draw bolts. The coupling or a portion thereof—in particular the front, bearing and/or rear plate—can also be integrated into the design of, for example, the crank or pedal and form one piece therewith. At the free outer end of the crank a pedal or handgrip 23 may be attached for driving a training device (e.g. a mobile exercise bicycle) or vehicle by the user.

The coupling, as previous discussed, can serve in many devices, as long as it is provided with a shaft-end 2 having a square cross-section comprising a transverse groove 3 of the type indicated above.

It is observed that both the coupling and shaft-end may be hollow, by providing them with (consecutively connected) axial bores. By additionally providing the coupling and/or the shaft-end with sealing rings or other seals, the proposed coupling (including shaft-end) can also be used for coupling tubes or other components (provided with a shaft-end having a substantially square cross-section and a continuous axial bore) with which gases and liquids can be transported.

While the invention has been described with a certain degree of particularity, changes could be made in the details of construction and the arrangement of components without departing from the spirit and scope of this disclosure. The invention is not limited to the preferred embodiments described here, but is limited only by the scope of the attached claims, including the full range of equivalency to which each element thereof is entitled.

The invention claimed is:

1. Coupling (1) for a shaft-end (2), substantially having a square cross-section, which at a distance (a) from its outer end is provided with a region with a transverse annular groove (3) having a circular or non-circular cross-section which is not greater over any angle than the smallest cross-section of the square shaft-end, the coupling comprising:
   a front plate (6), a locking plate (7) a bearing plate (12) and a rear plate (8) having a solid closed back surface, each of said plates being a flat planar plate, wherein the front plate and the locking plate both are provided with a continuous square opening (9 and 10 respectively) therethrough axially extending between front and rear surfaces thereof, and wherein the rear plate is provided with a non-continuous square opening (11) axially extending from a front surface thereof,
   wherein the front plate and the rear plate are fixedly interconnected in a position, in which the center lines of the openings in the front and rear plates are coaxially aligned and the orientation of the square openings correspond to each other,
   wherein the locking plate is rotatably mounted within a circular internal cavity of the bearing plate between the front plate and the rear plate such that the center line of the opening in the locking plate is coaxially aligned with the center lines of the openings in the front and rear plates, and such that the locking plate can be rotated back and forth between an unlocked position (I), in which the orientations of the square openings in the front plate and in the rear plate and the orientation of the square opening in the locking plate coincide with one another, and a locked position (II), in which the openings do not coincide, the coupling being arranged and sized such that in the unlocked position a square shaft-end can be inserted through the continuous square openings in the front plate and locking plate into the non-continuous square opening in the rear plate, after which the locking plate is rotated relative to the front plate and rear plate over a certain interlocking angle, by which the shaft-end is coupled with the assembly, which comprises the mutually interconnected front plate and rear plate and the interposed locking plate, so that the shaft-end cannot be pulled out without reversely rotating the locking plate into its unlocked position.

2. Coupling according to claim 1, wherein the bearing plate is provided with a recess (14) radially extending from an outer surface thereof to the internal cavity and the locking plate is provided with or connected to an actuating element (15) extending through the recess to the outside, the actuating element being dimensioned and configured such, that the actuating element can be used for rotating the locking plate back and forth between the unlocked position and the locked position.

3. Coupling according to claim 2, wherein the actuating element is provided with or connected to a guard member (17), which is being arranged for protecting the space (14) between the actuating element of the locking plate and the recess in the bearing plate.

4. Coupling according to claim 2, wherein securing means (18) are provided, which are being arranged for securing the locking plate or the actuating element relative to the front plate and/or the rear plate in the unlocked position and in the locked position.

5. Coupling (1) according to claim 1, being directly or indirectly connected with at least one similar coupling (1'), for interconnecting two or more shaft-ends (2, 2') having a square cross-section and being provided with a transverse groove.

6. Coupling according to claim 1, being directly or indirectly connected to a substantially, with respect to the longitudinal direction of the shaft-end, transverse extending machine or construction part directly or indirectly connected to said front plate and/or rear plate.

7. A coupling, said coupling comprising:
   a flat planar front plate being provided with a square opening therethrough axially extending between front and rear surfaces thereof;
   a flat planar rear plate being provided with a non-continuous square opening axially extending from a front surface thereof, having a solid closed back surface and wherein the front plate and the rear plate are fixedly interconnected in a position in which the center lines of the openings in the front and rear plates are coaxially aligned and the orientation of each square opening corresponds to each other;
   a flat planar bearing plate:
   a flat planar locking plate being provided with a square opening therethrough axially extending between front and rear surfaces thereof and rotatably mounted within a circular internal cavity of the bearing plate between the front and the rear plates such that the center line of the opening in the locking plate is coaxially aligned with the center lines of the openings in the front and rear plates, and such that the locking plate is rotatable between unlocked and locked positions, when in the unlocked position the orientation of each square opening in the front and rear plates and in the locking plate coincide with one another, and when in the locked position the square openings in each of the plates do not coincide; and
   a shaft-end having a square cross-section, which at a distance from its outer end is provided with a transverse annular groove having a circular or non-circular cross-section which is not greater over any angle than a smallest cross-section of the square shaft-end;
   the coupling being arranged and sized such that in the unlocked position, the square shaft-end can be inserted through each of the continuous square openings in the front plate and locking plate and into the non-continuous square opening in the rear plate: and
   wherein after the locking plate is rotated relative to the front plate and rear plate over a certain interlocking angle, the shaft-end is coupled with the mutually interconnected front plate and rear plate and the interposed locking plate so that the shaft-end cannot be pulled out without reversely rotating the locking plate into its unlocked position.

8. A device comprising a shaft-end (2) having a square cross-section and provided with a transverse groove (3) and a coupling (1) according to claim 7.

9. A device according to claim 8, being an exercise bicycle or other exercise device.

10. A device according to claim 8, being a bicycle or any other vehicle.

\* \* \* \* \*